(12) United States Patent
Kamfors et al.

(10) Patent No.: US 10,444,756 B2
(45) Date of Patent: Oct. 15, 2019

(54) NAVIGATION FOR A ROBOTIC WORKING TOOL

(71) Applicant: HUSQVARNA AB, Huskvarna (SE)

(72) Inventors: Mattias Kamfors, Jönköping (SE); Magnus Öhrlund, Malmbäck (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/534,201

(22) PCT Filed: Dec. 11, 2014

(86) PCT No.: PCT/EP2014/077384
§ 371 (c)(1),
(2) Date: Jun. 8, 2017

(87) PCT Pub. No.: WO2016/091312
PCT Pub. Date: Jun. 16, 2016

(65) Prior Publication Data
US 2017/0344012 A1    Nov. 30, 2017

(51) Int. Cl.
*G05D 1/02* (2006.01)
*A01D 34/00* (2006.01)
(Continued)

(52) U.S. Cl.
CPC ......... *G05D 1/0219* (2013.01); *A01D 34/008* (2013.01); *B60L 1/003* (2013.01);
(Continued)

(58) Field of Classification Search
CPC .. G05D 1/0219; G05D 1/0225; G05D 1/0265; G05D 1/0278; G05D 2201/0208;
(Continued)

(56) References Cited

U.S. PATENT DOCUMENTS 6,338,013 B1 * 1/2002 Ruffner ............... A01B 69/008
180/167
8,392,044 B2 * 3/2013 Thompson ........... A01D 34/008
180/168
(Continued)

FOREIGN PATENT DOCUMENTS

WO    2011057153 A1    5/2011

OTHER PUBLICATIONS

International Search Report and Written Opinion for International Application No. PCT/EP2014/077384 dated Oct. 2, 2015.
(Continued)

*Primary Examiner* — Behrang Badii
*Assistant Examiner* — Daniel L Greene
(74) *Attorney, Agent, or Firm* — Burr & Forman LLP

(57) ABSTRACT

A robotic work tool system (200) comprising a charging station (210) and a robotic work tool (100) configured to work within a work area (205) being divided into at least one section (405), the robotic work tool comprising a controller (110) for controlling the operation of the robotic work tool (100) to cause the robotic work tool to move along a trajectory, the robotic work tool (100) being configured to determine that a section boundary is encountered, and if so change the trajectory of the robotic work tool (100) to cause the robotic work tool to remain in the section.

19 Claims, 5 Drawing Sheets

(51) Int. Cl.
  *B60L 1/00* (2006.01)
  *B60L 3/00* (2019.01)
  *B60L 8/00* (2006.01)
  *B60L 15/20* (2006.01)
  *B60L 53/16* (2019.01)
  *B60L 50/52* (2019.01)
  *B60L 50/60* (2019.01)
  *A01D 34/64* (2006.01)
  *A01D 34/78* (2006.01)
  *A01D 101/00* (2006.01)

(52) U.S. Cl.
  CPC .......... *B60L 3/0061* (2013.01); *B60L 8/003* (2013.01); *B60L 15/20* (2013.01); *B60L 50/52* (2019.02); *B60L 50/66* (2019.02); *B60L 53/16* (2019.02); *G05D 1/0225* (2013.01); *G05D 1/0265* (2013.01); *G05D 1/0274* (2013.01); *G05D 1/0278* (2013.01); *A01D 34/64* (2013.01); *A01D 34/78* (2013.01); *A01D 2101/00* (2013.01); *B60L 2200/40* (2013.01); *B60L 2240/36* (2013.01); *B60L 2240/421* (2013.01); *B60L 2260/32* (2013.01); *G05D 1/0272* (2013.01); *G05D 2201/0208* (2013.01); *Y02T 10/645* (2013.01); *Y02T 10/7005* (2013.01); *Y02T 10/705* (2013.01); *Y02T 10/7072* (2013.01); *Y02T 10/7083* (2013.01); *Y02T 10/72* (2013.01); *Y02T 10/7275* (2013.01); *Y02T 90/14* (2013.01)

(58) Field of Classification Search
  CPC ... A01D 34/008; A01D 34/64; A01D 2101/00
  See application file for complete search history.

(56) References Cited

U.S. PATENT DOCUMENTS

| 8,600,582 | B2* | 12/2013 | Bernini | A01D 34/008 700/258 |
| 2002/0156556 | A1* | 10/2002 | Ruffner | A01B 69/008 701/23 |
| 2007/0260394 | A1* | 11/2007 | Dean | G01C 21/00 701/408 |
| 2008/0039974 | A1* | 2/2008 | Sandin | G05D 1/0255 700/258 |
| 2008/0097645 | A1* | 4/2008 | Abramson | A01D 34/008 700/258 |
| 2008/0183349 | A1* | 7/2008 | Abramson | A01D 34/008 701/23 |
| 2011/0295423 | A1 | 12/2011 | Anderson | |
| 2012/0265391 | A1* | 10/2012 | Letsky | A01D 34/008 701/25 |
| 2013/0006419 | A1 | 1/2013 | Bergström et al. | |
| 2013/0041526 | A1 | 2/2013 | Ouyang | |
| 2013/0211648 | A1 | 8/2013 | Yamamura et al. | |
| 2014/0324269 | A1* | 10/2014 | Abramson | G05D 1/0265 701/26 |
| 2015/0234385 | A1* | 8/2015 | Sandin | G05D 1/0265 700/258 |
| 2016/0129593 | A1* | 5/2016 | Wolowelsky | B25J 5/00 700/253 |

OTHER PUBLICATIONS

International Preliminary Report on Patentability for International Application No. PCT/EP2014/077384 dated Jun. 13, 2017.

* cited by examiner

NAVIGATION FOR A ROBOTIC WORKING TOOL

TECHNICAL FIELD

This application relates to a method, a robotic work tool system, a robotic work tool and a computer-readable storage medium for an improved navigation for a robotic work tool.

BACKGROUND

Contemporary robotic work tools usually work in an irregular manner as this reduces the risk of tracks being formed by for example a lawnmower, the irregular pattern avoiding repeated movement in an area. However, the irregular often random working behaviour makes it difficult for, for example a lawnmower robot, to access areas to which the access is partially blocked by an object, such as a tree. This results in that the robotic lawnmower may not spend enough time in such an area (difficulties entering) or too much time in such an area (difficulties in exiting).

Prior art solutions include laying guide cables to allow the robotic lawnmower to find its way in to/out of such areas. However, the use of a guide cable does not ensure that enough time is spent in the area, and, the robot may exit too early as it may exit the area when it encounters the guide cable again. Furthermore, the guide cable requires that the user installs it, which may be complicated as the guide cable may have to be of a certain length and/or in a specific location to ensure proper mowing of the lawn.

There is thus a need for a manner of enabling reliable operation of a robotic work tool even in areas to which the access/exit may be partially blocked while ensuring an even mowing over the whole work area.

SUMMARY

It is an object of the teachings of this application to overcome the problems listed above by providing a robotic work tool system, comprising a charging station and a robotic work tool configured to work within a work area being divided into at least one section, the robotic work tool comprising a controller for controlling the operation of the robotic work tool to cause the robotic work tool to move along a trajectory, the robotic work tool being configured to determine that a section boundary is encountered, and if so change the trajectory of the robotic work tool. This causes the robotic work tool to remain within the section that is currently occupied or being worked on. A trajectory will be understood herein as to mean the current direction travelled by the robotic work tool.

In one embodiment the robotic work tool is a lawnmower robot.

It is also an object of the teachings of this application to overcome the problems listed above by providing a method for use in a robotic work tool system comprising a charging station and a robotic work tool configured to work within a work area being divided into at least one section, the robotic work tool comprising a controller for controlling the operation of the robotic work tool to cause the robotic work tool to move along a trajectory, the method comprising determining that a section boundary is encountered, and if so changing the trajectory of the robotic work tool.

In one embodiment the method further comprises determining if a switch section signal has been received, and if not, changing the trajectory of the robotic work tool.

It is also an object of the teachings of this application to overcome the problems listed above by providing a method for use in a robotic work tool configured to work within a work area being divided into at least one section, the robotic work tool comprising a controller for controlling the operation of the robotic work tool to cause the robotic work tool to move along a trajectory, the method comprising determining that a section boundary is encountered, and if so changing the trajectory of the robotic work tool.

It is also an object of the teachings of this application to overcome the problems listed above by providing a computer readable storage medium encoded with instructions that, when executed on a processor, performs the method according to claim.

The inventors of the present invention have realized, after inventive and insightful reasoning that by dividing the work area into smaller preferably virtual sections that the robotic work tool services in turn, a better coverage of difficult to reach areas may be achieved.

It should be noted that even though the teachings herein discloses physically bordered sections, virtual sections are preferred.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
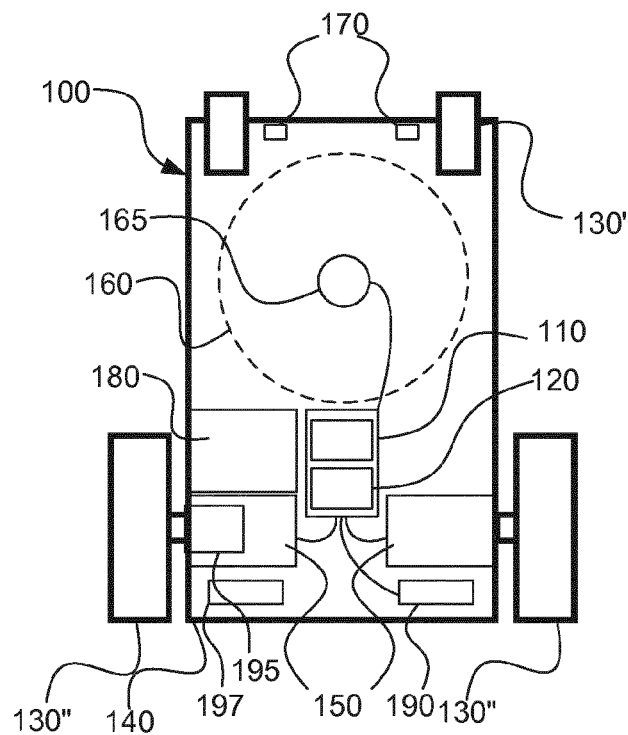
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100 including, but not being limited to, the propulsion of the robotic work tool. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 may further have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is close to or crossing a boundary wire, or inside or outside an area enclosed by the boundary wire.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller may also be configured to determine the load exerted on the rotating blade, by for example measure the power delivered to the cutter motor 165 or by measuring the axle torque exerted by the rotating blade. The robotic work tool 100 also has (at least) one battery 180 for providing power to the motors 150 and the cutter motor 165. The robotic work tool 100 is, in one embodiment, a lawnmower robot.

In on embodiment the robotic work tool 100 is a farming equipment, a mine clearance robot, or a golf ball retrieval robot.

The robotic work tool 100 may also be arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position.

The robotic work tool 100 may further be arranged with at least one sensor 195 for providing signals for deduced reckoning navigation, also referred to as dead reckoning. Examples of such deduced reckoning navigation sensors 195 are odometers and compasses.

The robotic work tool 100 may further be arranged with a wireless communication interface 197 for communicating with other devices, such as a server, a personal computer or smartphone or the charging station. Examples of such wireless communication devices are Bluetooth™, Global System Mobile (GSM) and LTE (Long Term Evolution) to name a few.

Figure 2:
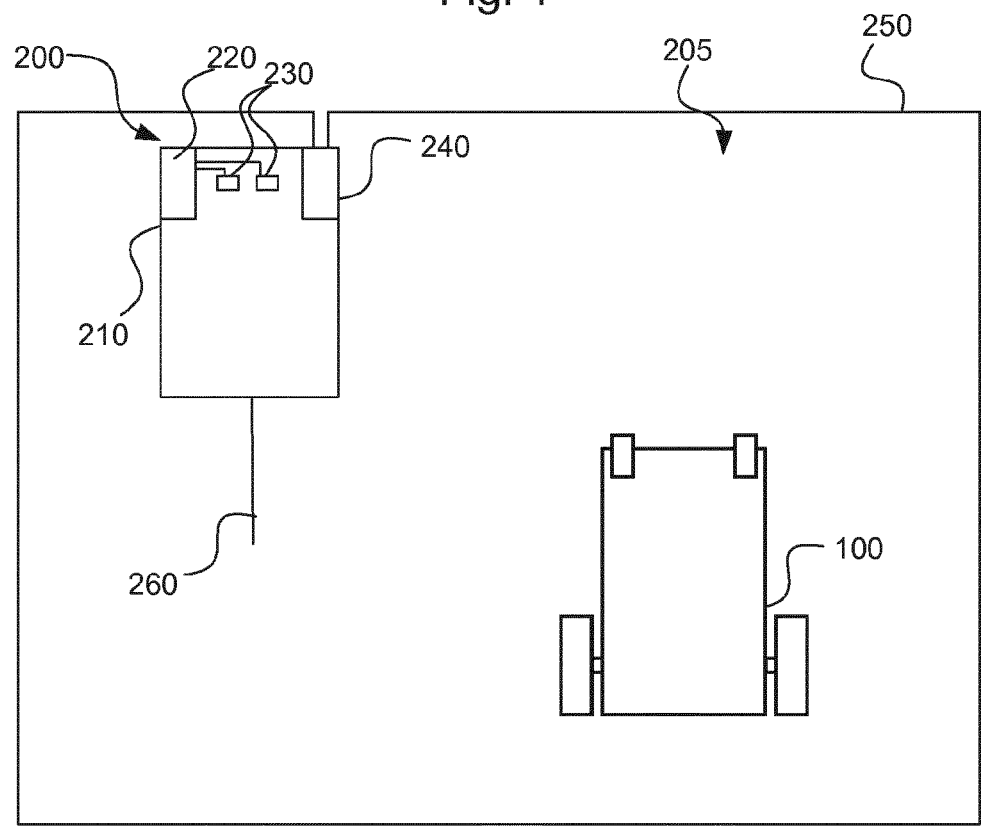
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

Figure 3:
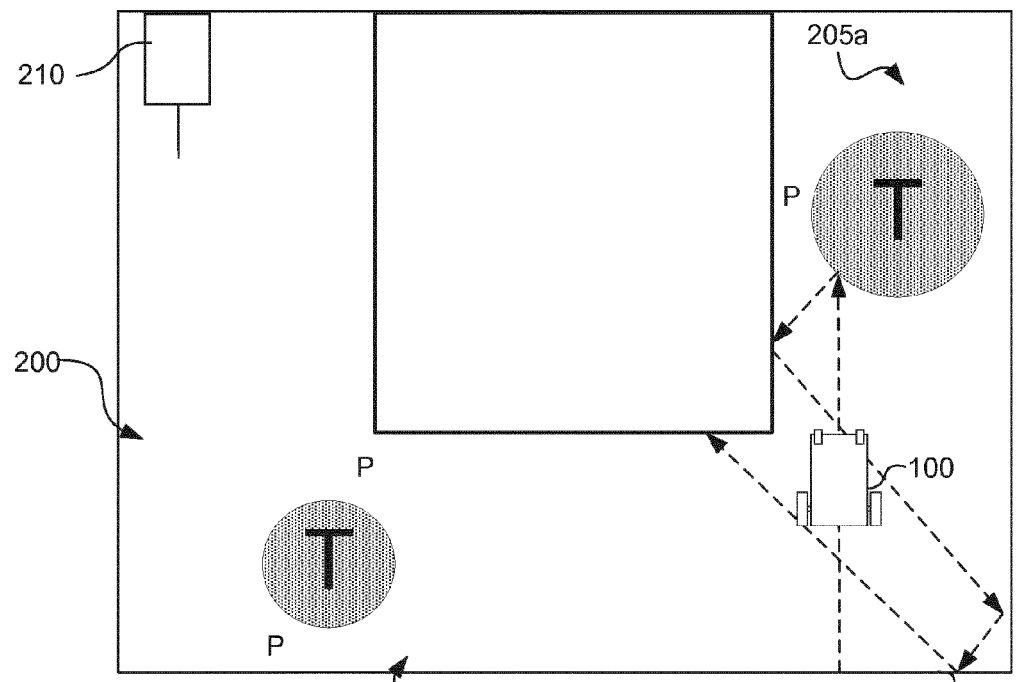
FIG. 3 shows a schematic view of a robotic working tool system in operation according to one embodiment of the teachings of this application.

FIG. 3 shows a schematic view of a robotic work tool system where the problem of the prior art is illustrated. Depicted is a schematic garden surrounding a house or other building. In the example of FIG. 3, there are two trees T. A robotic work tool 100 may find difficulties entering the area 205a behind the tree T in the upper right hand corner of a work area 205. The robotic work tool 100 may also find it difficult to navigate the passages indicated P pass the tree in the lower left hand side corner. A boundary wire 250 encloses the working area 205 in which the robotic work tool 100 is configured to operate within and each time the robotic work tool 100 comes upon the building, the tree or the boundary wire it will change direction as is indicated by the dashed arrows indicating a path of the robotic work tool 100. As can be seen, even though the robotic work tool 100 may be travelling towards the work area that is difficult to reach 205a, it will inadvertently be forced onto a path leading away from the work area 205a.

Figure 4:
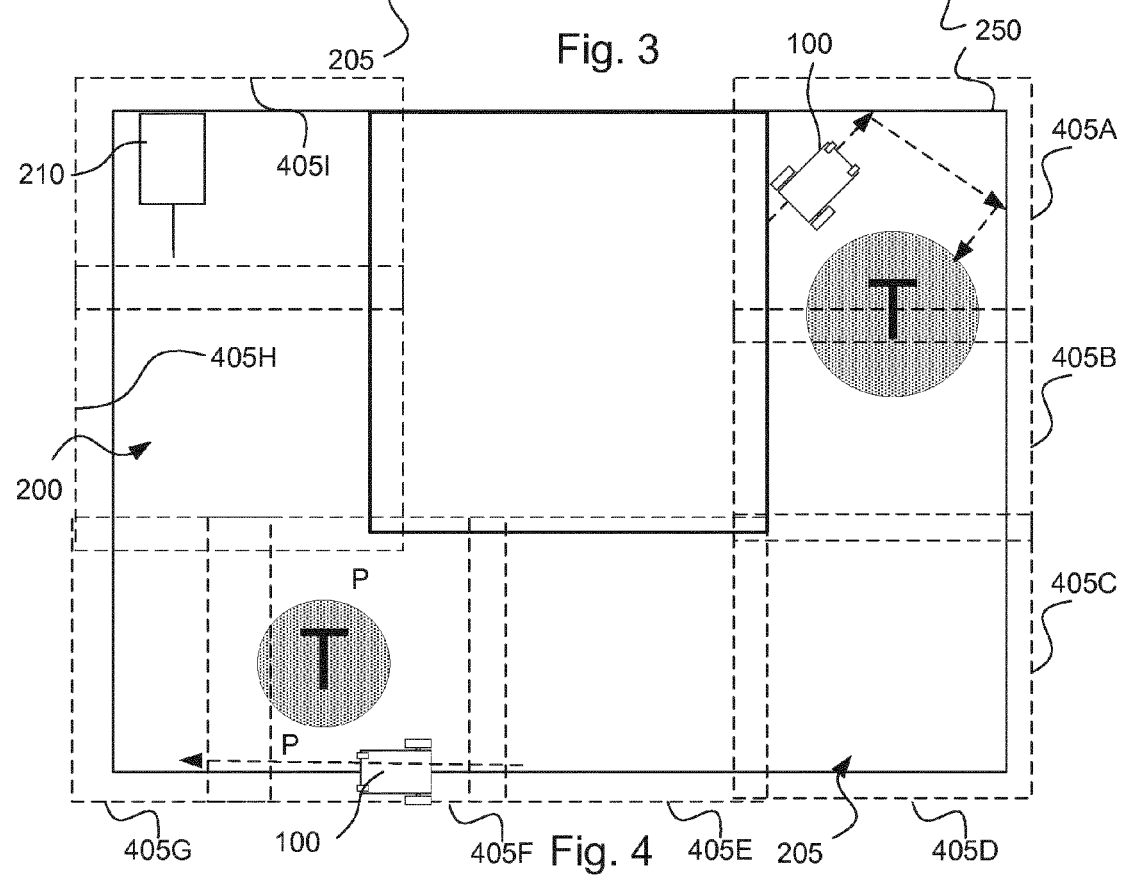
FIG. 4 shows a schematic view of a robotic working tool system in operation according to one embodiment of the teachings of this application.

FIG. 4 shows a schematic view of a robotic work tool system 200 according to the teachings herein, such as the robotic work tool system 200 of FIG. 2, where the problem is solved by a combination of a boundary wire and GNSS or deduced reckoning navigation or other navigation system. It should be noted that, as has been discussed in the above, the boundary wire may be a physical boundary wire or a boundary specified in the memory 240 of the robotic work tool 100 for GNSS or deduced reckoning assisted navigation.

The robotic work tool 100 is provided with a virtual map of the working area 205. The virtual map may simply be a collection of geographical positions, for example indicating the boundaries of the work area, or it may be a more detailed virtual or digital map.

The robotic work tool 100 is configured to divide the work area into sections 405A-I, either based on the map of the work area 205 (possibly being only corner coordinates) or by receiving from an external server or through user input. Alternatively or additionally, the sections are specified based on a current position of the robotic work tool 100, wherein the sections 405 may be defined as for example +/−10 m in all directions from a current position. In the example of FIG. 4, the sections are shown to be overlapping, however it should be noted that they may also be specified as being abutting each other or a combination thereof. By allowing the sections to overlap, the operating coverage between two sections is increased.

The robotic work tool 100 is thus configured to control its operation not only on a boundary wire (physical or virtual) (and/or on collision detection), but also on a virtual boundary of a section 405 of the work area 205 and as it is determined that the robotic work tool 100 is close to, is crossing or has crossed (hereafter referred to as encountering) a section boundary, the robotic work tool 100 will change its trajectory. A section 405 may be associated with a section time and the robotic work tool 100 may be configured to spend at least the section time within the associated section. The robotic work tool 100 may then be configured to reset a timer as it enters a new section 405. The robotic work tool 100 is thus configured to determine if section timer has not yet exceeded the associated section time when a section boundary is encountered, and if so change the trajectory of the robotic work tool 100.

The section time may be based on a size of the section, a configuration of the section and/or a complexity of a section. A section having many obstacles may be given a higher section time than an open section.

To ensure that the robotic work tool 100 actually also leaves a section 405, the robotic work tool 100 may be configured to determine that the section timer has exceeded the associated section time, and if so follow a boundary wire 250 out of the section next time the boundary wire 250 is encountered. In FIG. 4, this is illustrated as the robotic work tool 100 in the lower side of the garden following the boundary wire 250 out of section 405F and into section 405G. This also enables the robotic work tool 100 to easily navigate through passages P passed obstacles such as trees T. In one embodiment, the robotic work tool 100 is configured to order the sections in a working order and visit the sections 405 in the working order. For the example of FIG. 4, the robotic work tool 100 may be configured to visit the sections in the order 405I-405H-405G-405F-405E-405D-405C-405B-405A-405B-405C-405D-405E-405F-405G-405H-405I. In such an embodiment, the sections may also have different associated section times to ensure that an equal time is spent in each section. For the example given above, the associated section time for the last section 405A would be double the associated section times for the other sections.

The robotic work tool 100 may thus also be configured to determine that as an encountered section boundary does not border on a next section when a section boundary is encountered, and if so, change the trajectory of the robotic work tool 100. This allows for the robotic work tool 100 to keep looking for the correct section to proceed into, possibly by changing directions along the boundary wire 250 when it is being followed.

Figure 5:
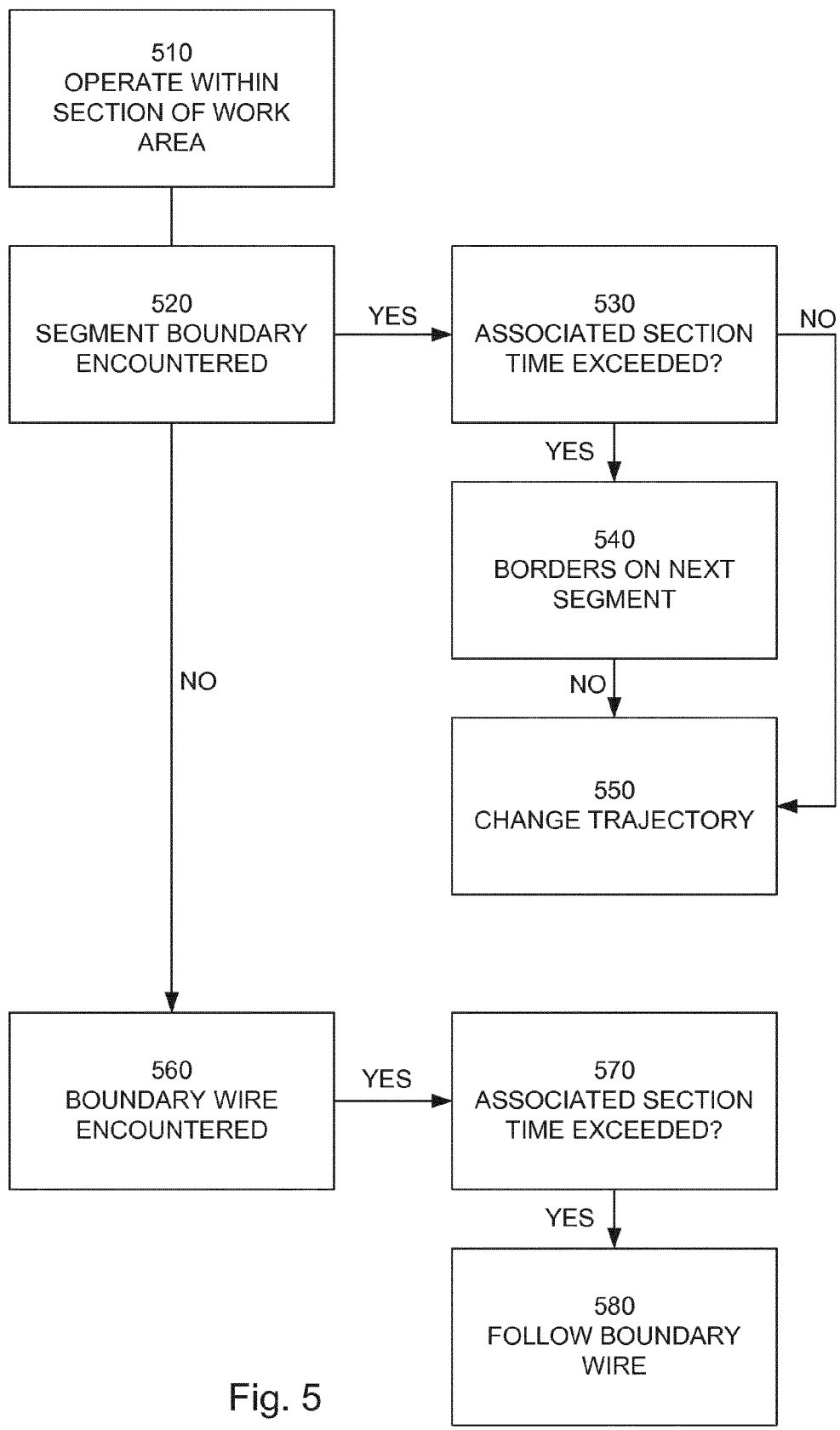
FIG. 5 shows a flowchart for a general method according to herein.

FIG. 5 shows a flowchart for a general method according to herein, where a robotic work tool 100 is operating 510 within a section of a work area 205. The robotic work tool 100 is configured to determine that a section boundary is encountered 520 and if so determine if the associated section time has been exceeded 530 and if not so change its trajectory 550.

If the associated section time is exceeded, the robotic work tool is configured to determine whether the encountered section boundary borders on a next section 540, and if not so change its trajectory 550.

The robotic work tool 100 is also configured to determine that a boundary wire 250 is encountered 560 and if so determine if the associated section time has been exceeded 570 and if so follow the boundary wire out of the current section 580.

Figure 6:
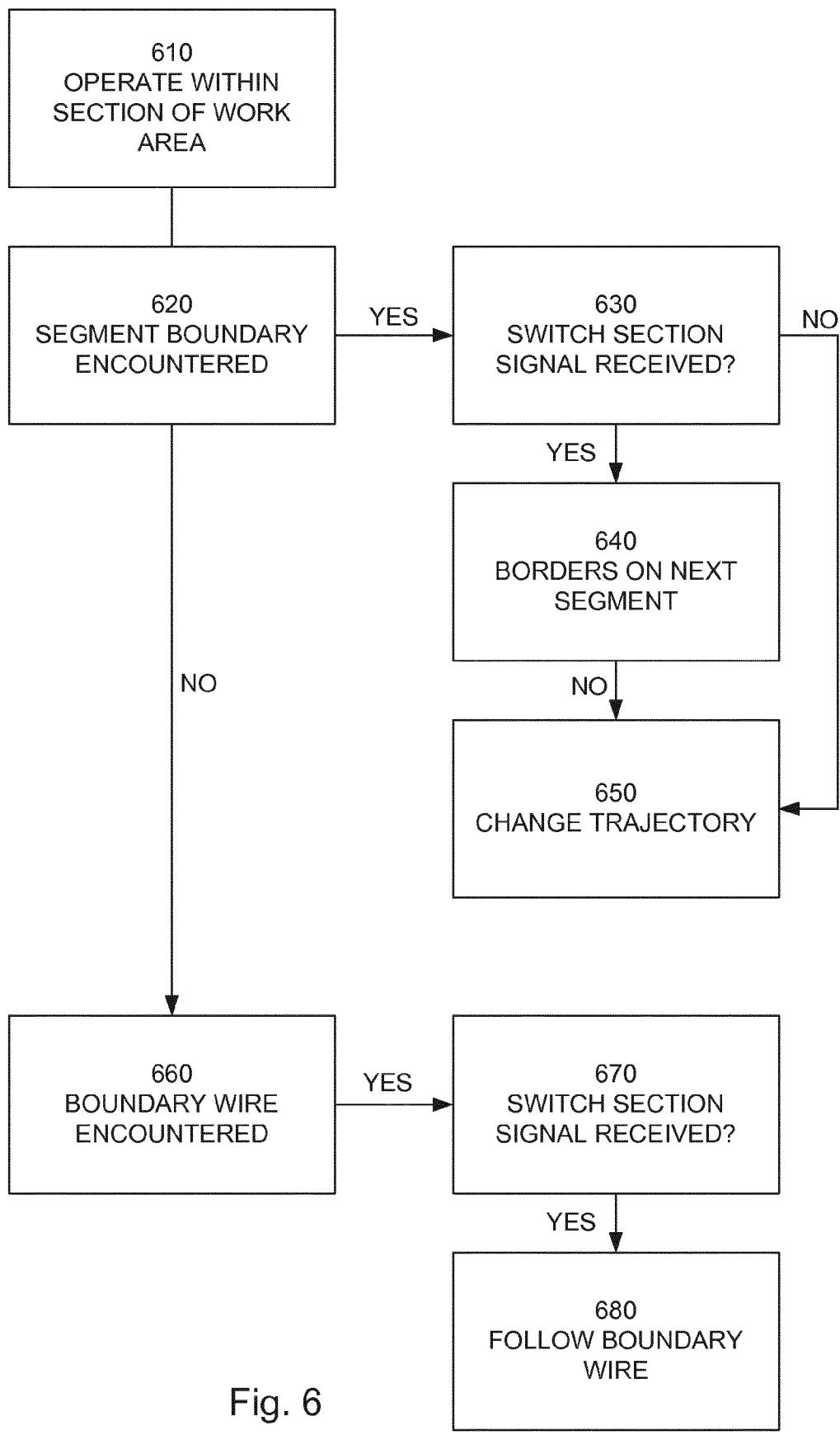
FIG. 6 shows a flowchart for a general method according to herein.

FIG. 6 shows a flowchart for an alternative general method according to herein, but without the use of associated times. The robotic work tool 100 may be configured to receive direct input (from the user or from the charging station) that it is time to change sections, indicated by receiving a switch section signal. The switch section signal may carry an indication of which section to switch to, either next or one further away. The switch signal can be received through user input via a key or such on the robotic work tool 100 or via a remote control, or through signalling through the boundary wire 250. The switch section signal may also be received through a wireless communication interface 197. The switch section signal may also be determined internally in the robotic work tool, wherein it is said to be received by the controller for the context of this application.

The switch section signal may also be issued internally from the controller, for example when it is determined that the grass is of a specific height. This can be determined that the load on the grass cutting device 165 has been below a threshold value for a period of time. The robotic work tool 100 is operating 610 within a section of a work area 205. The robotic work tool 100 is configured to determine that a section boundary is encountered 620 and if so determine if a switch section signal has been received 630 and if not so change its trajectory 650.

If the switch section signal has been received, the robotic work tool 100 is configured to determine whether the encountered section boundary borders on a next section 640 (possibly as specified by the switch section signal), and if not so change its trajectory 650.

The robotic work tool 100 is also configured to determine that a boundary wire 250 is encountered 660 and if so determine if the switch section signal has been received 670 and if so follow the boundary wire out of the current section 680.

It should be noted that the switch section signal may be issued as the associated section time is exceeded.

It should be noted that the exact order of the actions above is not important and the detection of a boundary section may be determined before a boundary wire is detected and vice versa.

A section boundary may be virtual and determined through use of GNSS or deduced reckoning. The section may be given with reference to (map) coordinates or relative to a position.

A section boundary may be also be physical and determined through use of beacons or other navigation means such as a section boundary wire. As has been discussed with reference to FIG. 2, one boundary wire may be coded through the signal being transmitted through it. Therefore a robotic work tool 100 may be configured to differentiate one wire from another by checking the signal that is being transmitted through the wire(s).

It should be noted that even though the mowing pattern shown in the exemplifying figures are very simple, the teachings herein may be beneficially used to provide advanced mowing patterns taking into account obstacles or other (garden) architectural features.

The section may also be a sliding section so that it moves with the robotic work tool as it services the work area. In such a case, the switch section signal may be a signal to move the section borders. This would thus implement a sliding operating window or section in which the robotic work tool operated.

Figure 7:
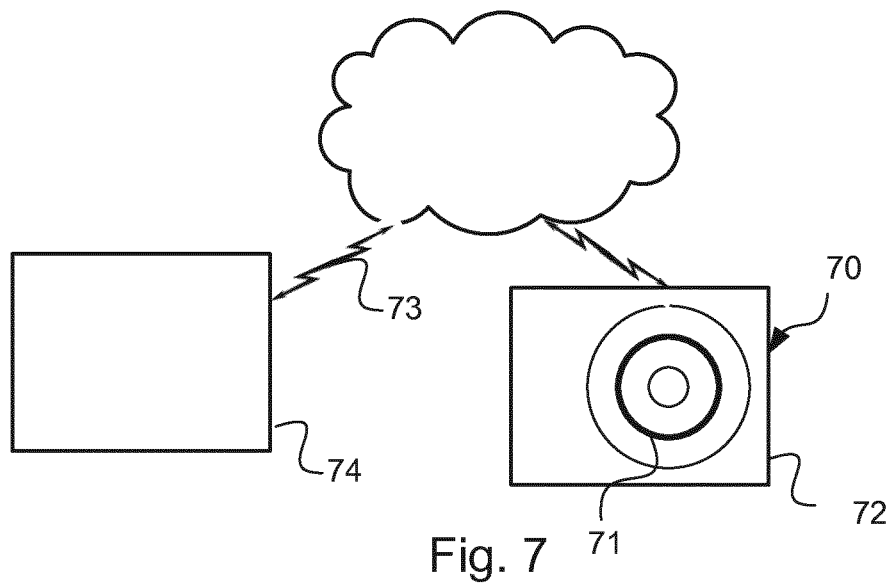
FIG. 7 shows a schematic view of a computer-readable medium according to herein.

FIG. 7 shows a schematic view of a computer-readable medium as described in the above. The computer-readable medium 70 is in this embodiment a data disc 70. In one embodiment the data disc 70 is a magnetic data storage disc. The data disc 70 is configured to carry instructions 71 that when loaded into a controller, such as a processor, executes a method or procedure according to the embodiments disclosed above. The data disc 70 is arranged to be connected to or within and read by a reading device 72, for loading the instructions into the controller. One such example of a reading device 72 in combination with one (or several) data disc(s) 70 is a hard drive. It should be noted that the computer-readable medium can also be other mediums such as compact discs, digital video discs, flash memories or other memory technologies commonly used. In such an embodiment the data disc 70 is one type of a tangible computer-readable medium 70.

The instructions 71 may also be downloaded to a computer data reading device 74, such as a computer or other device capable of reading computer coded data on a computer-readable medium, by comprising the instructions 71 in a computer-readable signal 73 which is transmitted via a wireless (or wired) interface (for example via the Internet) to the computer data reading device 74 for loading the instructions 71 into a controller. In such an embodiment the computer-readable signal 73 is one type of a non-tangible computer-readable medium 70.

The instructions may be stored in a memory (not shown explicitly in FIG. 7, but referenced 240 in FIG. 2) of the computer 74.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a charging station and a robotic work tool, the robotic work tool comprising a controller, the controller being configured to divide a work area into a plurality of sections and control the operation of the robotic work tool to cause the robotic work tool to move along a trajectory within a section of the plurality of sections, the robotic work tool being configured to determine that a boundary of the section is encountered, and if so change the trajectory of the robotic work tool to cause the robotic work tool to remain within the section.

2. The robotic work tool system according to claim 1, wherein the robotic work tool is further configured to determine whether the boundary of the section borders on a next section of the plurality of sections, and if not, change the trajectory of the robotic work tool when it is determined that the switch section signal has been received.

3. The robotic work tool system according to claim 1, wherein the robotic work tool is a robotic lawnmower, and wherein the robotic work tool system further comprises a boundary wire arranged to enclose the work area.

4. The robotic work tool system of claim 1, wherein the robotic work tool is further configured to order the plurality of sections in a working order and visit each of the sections according to the working order.

5. The robotic work tool system according to claim 1, wherein the robotic work tool is further configured to determine whether a switch section signal has been received, and if not, change the trajectory of the robotic work tool.

6. The robotic work tool system according to claim 5, wherein the robotic work tool is further configured to determine that a boundary wire is encountered, and if so, determine if the switch section signal has been received and if so follow the boundary wire out of the section.

7. The robotic work tool system according to claim 6, wherein the robotic work tool is further configured to determine that the switch section signal has been received when an associated section time has been exceeded.

8. The robotic work tool system according to claim 6, wherein the robotic work tool is further configured to receive the switch section signal through the boundary wire.

9. The robotic work tool system according to claim 6, wherein the robotic work tool is further configured to receive the switch section signal through user input.

10. The robotic work tool system according to claim 1, wherein the robotic work tool further comprises a position determining device and wherein the boundary of the section is virtual and the robotic work tool is configured to determine that it has encountered the boundary through use of the position determining device.

11. The robotic work tool system according to claim 10, wherein the section is defined by coordinates.

12. The robotic work tool system according to claim 10, wherein the section is defined relative to a position of the robotic work tool.

13. The robotic work tool system according to claim 10, wherein the boundary is also physical and determined through use of beacons or other navigation means such as a section boundary wire in combination with the position determining device.

14. The robotic work tool system according to claim 10, wherein the position determining device is a Global Navigation Satellite System device.

15. The robotic work tool system of claim 1, wherein the robotic work tool is further configured to associate a section time with the section and spend at least the section time within the section, and wherein the robotic work tool is further configured to determine if the section time has been exceeded, and if so, leave the section.

16. The robotic work tool system of claim 15, wherein the section time is based on a size of the section, a configuration or complexity of the section, or a number of obstacles in the section.

17. A robotic work tool comprising a controller configured to divide a section of a work area into a plurality of subsections and control the operation of the robotic work tool to cause the robotic work tool to move along a trajectory within a subsection of the plurality of subsections, the robotic work tool being configured to determine that a boundary of the subsection is encountered, and if so change the trajectory of the robotic work tool to remain within the subsection.

18. A method for controlling operation of a robotic work tool comprising a controller, the method comprising:
   dividing, via the controller, a work area into a plurality of sections;
   causing, via the controller, the robotic work tool to work within a section of the plurality of sections;
   determining that a boundary of the section is encountered, and if so changing the trajectory of the robotic work tool to remain within the section.

19. The method according to claim 18, wherein the method further comprises determining if a switch section signal has been received, and if not, changing the trajectory of the robotic work tool.

\* \* \* \* \*